May 9, 1939.    J. BENZ    2,157,949

WRAPPING MACHINE

Original Filed April 2, 1937

INVENTOR
JOHANNES BENZ
BY *Norris & Bateman*
ATTORNEYS

Patented May 9, 1939

2,157,949

UNITED STATES PATENT OFFICE 2,157,949

WRAPPING MACHINE

Johannes Benz, Dusseldorf, Germany

Original application April 2, 1937, Serial No. 134,628. Divided and this application November 28, 1938, Serial No. 242,807. In Germany April 7, 1936

2 Claims. (Cl. 93—2)

This application is a division of my co-pending application Serial No. 134,628, filed April 2, 1937. This invention relates to a semi-automatic machine for wrapping substantially rectangular pieces of material adherent to paper, for example butter, which are fed to the machine, for example, by the scraper of a butter moulding machine such as is described in my said co-pending Patent Application Serial No. 134,628. The wrapping machine is characterised particularly by a paper holder or frame provided with an opening or window and adapted to hold a piece of wrapping paper over the window so that as the article to be wrapped is thrust through the window it is covered on three sides by the paper. The machine further comprises two conveyer belts mounted side by side level with a work table. In the path of the conveyed article there are arranged a controlled finger or the like which turns the article about an edge for covering its fourth side with paper and a stationary member for turning the article about another edge to complete the covering of the article on four sides.

A block of wrapping papers may be arranged in front of or above the paper holder. The individual sheets may be inserted in the paper holder by hand. The conveyer belts may be driven by any desired driving means so that, apart from the insertion of the individual sheets of paper by hand, the entire machine operates automatically.

Owing to the fact that the wrapping of the moulded pieces of butter or the like occurs while they are being conveyed by means of the conveyer belts, the machine may be used in conjunction with a moulding machine of any desired kind. It is merely necessary to adapt the speed of the belt to suit the output of the moulding machine.

An object of the invention is to provide a machine for wrapping moulded butter or like material which is very simple in construction and operation.

A further object of the invention is to provide a machine which is cheap to manufacture and is particularly suited for use in small butter handling depots.

An example of the invention described with reference to the wrapping of moulded pieces of butter is illustrated in the accompanying drawing, in which—

Figure 1:
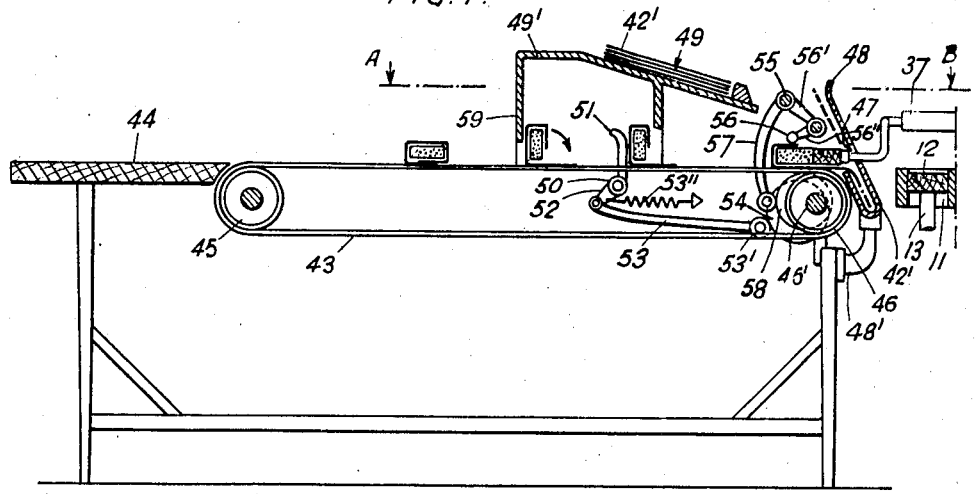
Fig. 1 is a longitudinal section through a machine according to the invention.
Figure 2:
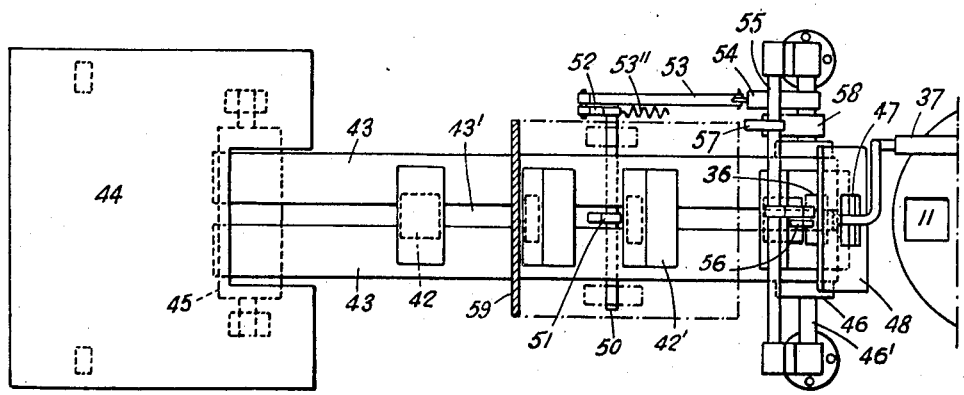
Fig. 2 is a section on the line A—B of Fig. 1.

The base of the moulding chamber 11 of a butter moulding machine is formed by a plunger 12, which as actuated by a rod 13 by means not shown in the drawing to eject the moulded pieces of butter. After the pieces of butter have been ejected they are deposited as hereinafter described by a scraper 36 actuated by a rod 37, by means not shown in the drawings, on a pair of conveyer belts 43 which are mounted side by side, with a space 43' between them. In front of the conveyer belts 43 there is arranged a work table 44. On this table 44 the packing of the butter can be completed, as the wrapping device which is still to be described wraps the pieces of moulded butter on four sides.

The conveyer belts 43 run continuously over rollers 45, 46. The roller 46 which is keyed to a shaft 46' may be driven in any desired manner. In front of the conveyer belts 43 there is mounted on a bracket 48' a paper holder 48 provided with a window 47 consisting of a plate bent in the shape of a hook. Above the conveyer belts 43 is located on a stationarily mounted table 49' the pile 49 of individual sheets 42' of wrapping paper. Before each removal of a moulded piece of butter 42 from the plunger 12, by means of the scraper 36, a sheet 42' from the pile 49 is placed in the paper holder 48 over the window 47.

Between the conveyer belts 43 there is provided a finger 51 which pivots about a shaft 50 and is controlled by a cam 54 fixed to the shaft 46' by means of an arm 52 and a connecting rod 53 having a roller 53'. The latter is kept in contact with the cam by a spring 53". Immediately in front of the paper holder 48 there is mounted a roller 56 which is controlled by means of an arm 57 one end of which rides on a second cam disc 58 fixed to the shaft 46', while the other end is connected with the roller 56 through a shaft 55 and links 56', 56". Behind the controlled finger 51 there is provided a stationary wall 59 which may be an extension of the table 49' supporting the pile 49 as shown.

The machine described operates in the following manner:

The pusher 36 thrusts the piece of butter through the window 47 of the paper holder 48. During this operation the piece of butter carries along with it the inserted sheet of wrapping paper 42'. The latter is thereupon bent over by the paper holder 48 and by the roller 56, which is moved by the shaft 55 from left to right (Fig. 1), so that the piece of butter 42 is wrapped on three sides.

As soon as the piece of butter, wrapped to this extent, passes over the finger 51, the latter is erected from the horizontal position by the cam

54, thus turning the piece of butter about an edge into the upright position. The piece of butter is now wrapped on three and a half sides. The finger 51 is then immediately lowered to the horizontal position and the piece of butter is further conveyed (in and upright position) against the wall 59, which turns the moulded piece of butter about a second edge by virtue of the fact that the butter is being moved by the conveyer belts 43. The piece of butter is now wrapped on four sides and in this state arrives at the work table 44. Here the packing can be completed by hand by folding the side portions of the wrapping.

I claim:

1. Apparatus for wrapping substantially rectangular pieces of material adherent to paper, for example butter, which comprises in combination a conveyer having a substantially horizontal upper surface arranged for linear travel, means adjacent one end of said surface to receive a sheet of wrapping material, a device adjacent said means for pushing an article to be wrapped into said sheet in the direction of travel of said conveyer surface, mechanism for partially folding said material around the article as it leaves said means, a second mechanism interposed in the path of travel to alter the position of the partially wrapped article with respect to the conveyer surface, and means adjacent said surface to partially obstruct the continued path of travel of the article and thus cause an automatic further wrapping of the article in said sheet.

2. Apparatus for wrapping substantially rectangular pieces of material adherent to paper, for example butter, which comprises in combination a pair of conveyer belts arranged side by side, a frame having a window and adapted to hold a piece of wrapping paper in front of said window and located at one end of said conveyer belts, a device adjacent said frame for pushing an article to be wrapped through said window in the direction of travel of said conveyer belts, guide means operable to fold said piece of wrapping paper adhering to the article leaving the window over the upper surface of the article, a stop member, means for moving the stop member between the conveyer belts into the path of the article as the latter moves over said stop member, to turn said article about an edge, means for removing said stop member from said path to allow the article so turned to pass, and a stationary member, arranged in the path of the article to turn it about another edge.

JOHANNES BENZ.